INVENTOR.
ANTHONY P. CELILLO
BY Julian Caplan
ATTORNEY

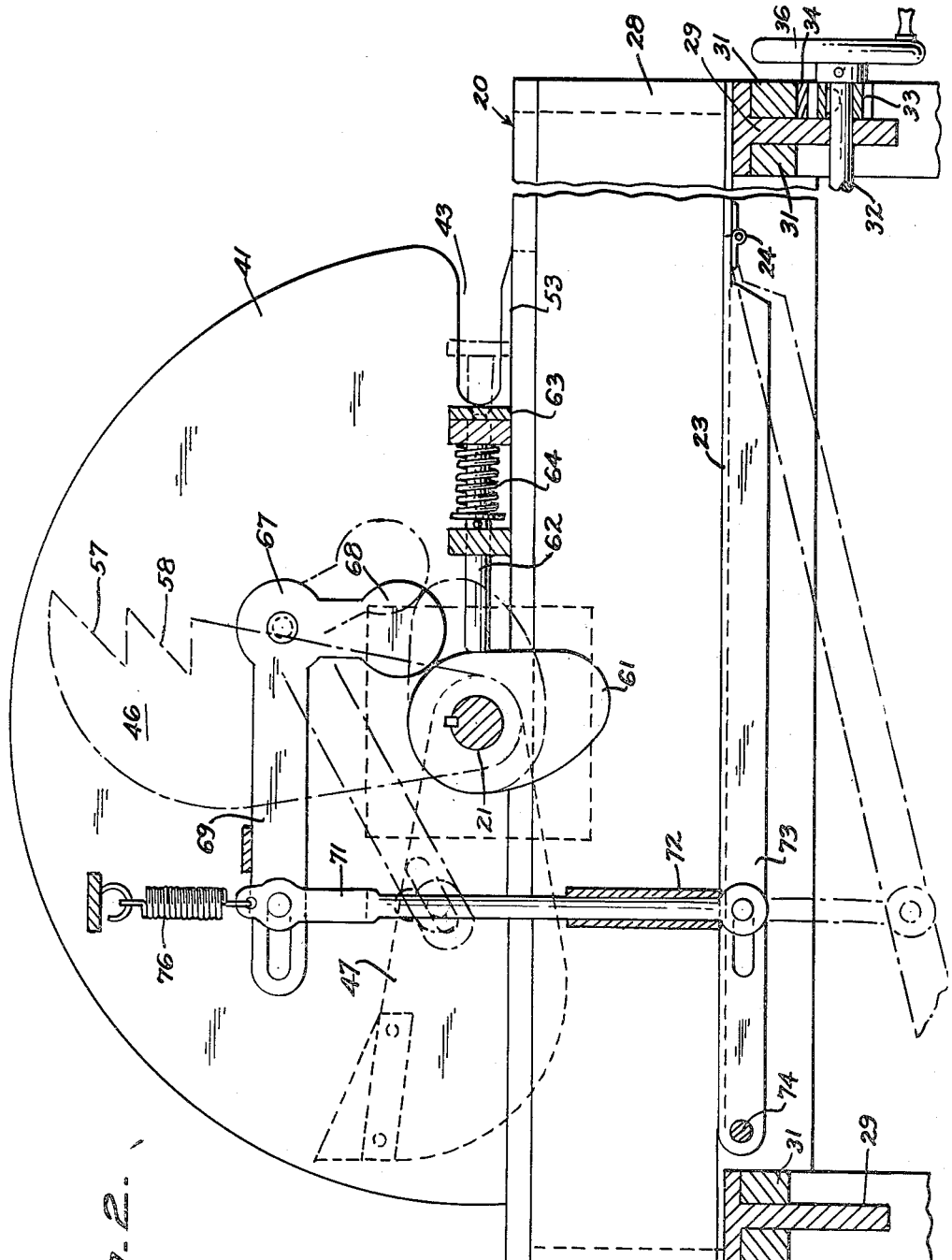

United States Patent Office 2,715,748
Patented Aug. 23, 1955

2,715,748

APPARATUS FOR REMOVING TENDONS FROM AND TRIMMING POULTRY

Anthony P. Celillo, San Francisco, Calif.

Application July 14, 1952, Serial No. 298,730

6 Claims. (Cl. 17—11.3)

This invention relates to new and useful improvements in apparatus for removing the tendons from, and trimming the head and feet from, poultry. Poultry, and particularly turkeys, have tendons in the legs which it is desirable to remove in order to make it possible to prepare and serve the drumsticks of the fowl. The present invention comprises a mechanical means for removing the tendons on a commercial basis. During the same operation, the neck and feet of the fowl may be trimmed off.

The present invention provides a machine, which may be power operated or which may be manually operated, having a table on which the fowl is placed. A tendon puller arm is rotatably mounted on the machine arranged to break the leg bone of the fowl below the knee joint and thereupon pull the severed part of the leg, thereby drawing the tendons out of the upper leg portion of the carcass. Immediately thereafter knives sever the leg portion at the knee joint and also sever the head from the neck. Provision is also made for ejecting the stub of the leg at the knee joint and for transferring the carcass to a conveyor or container for further processing.

Employment of the present invention materially reduces the manual labor presently involved in pulling the tendons. It further reduces the labor involved in severing the head and feet of poultry, which are customarily manual operations.

By reason of the fact that a positive pulling force is imparted to the tendons which is relatively constant by reason of the mechanical nature of the force imparted, and hence not subject to the variation to be expected when tendons are pulled manually, a more uniform product results.

The foregoing and other objects and advantages of the invention will become apparent from reading the following written description, reference being had to the accompanying drawings in which:

Fig. 2 is a vertical section taken substantially along the line 2—2 of Fig. 1.

Figure 1:
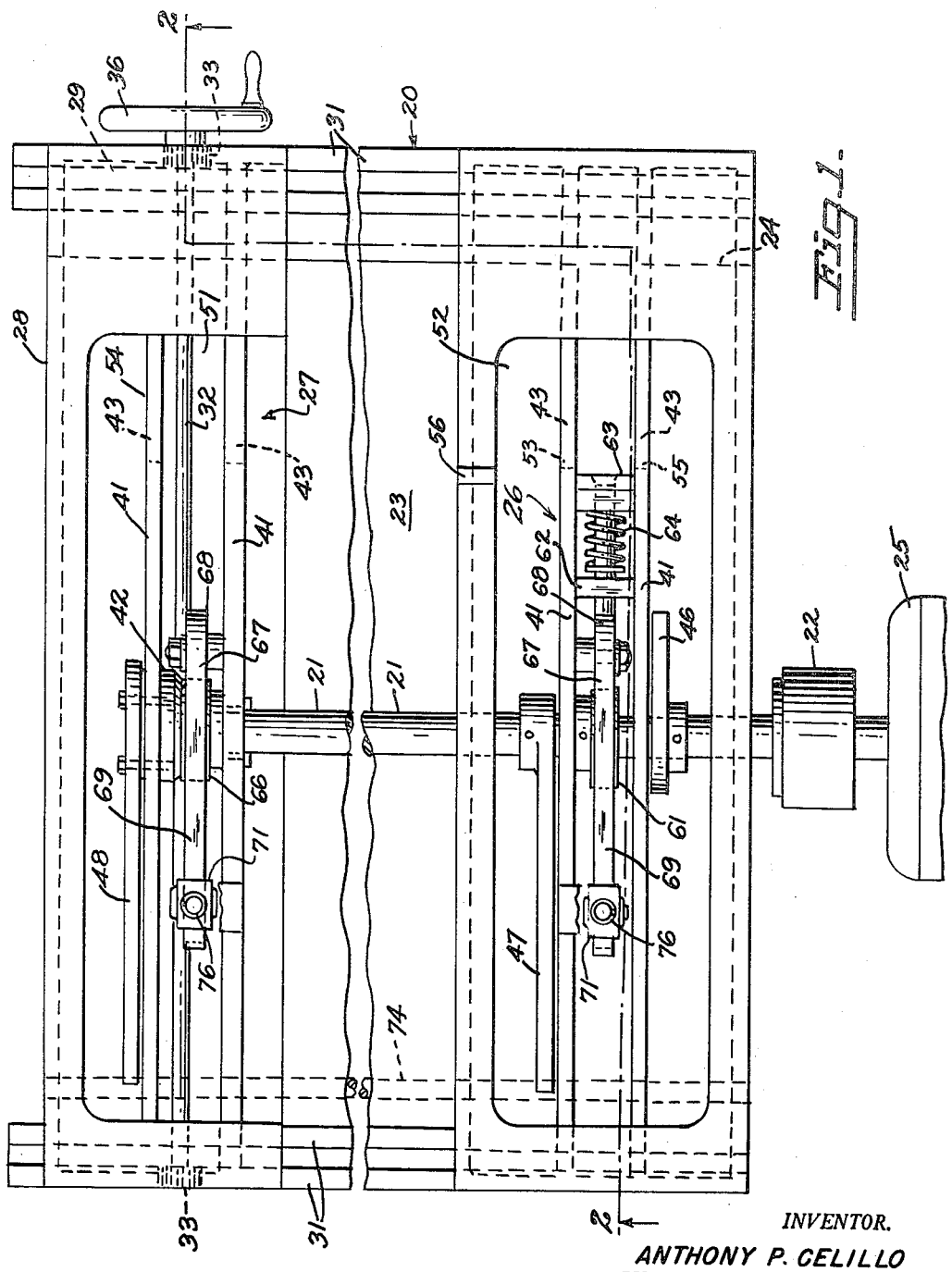
Fig. 1 is a top plan.

The instant invention employs a machine mounted on a frame 20 which rests on the floor, the working parts of the machine being at convenient height for the operator. A horizontal, transverse drive shaft 21 is suitably journaled in the machine. The drive shaft may be rotated in various ways, but desirably the shaft is driven by an electric motor 25 fitted with a suitable reduction gear and driving shaft 21 through a one-cycle clutch 22 which permits one revolution of the shaft upon actuation of a pedal or other lever (not shown).

Carried on frame 20 is a table 23 which is jointed at hinge 24 adjacent the front transverse edge of the machine. When table 23 is horizontal, it provides a resting surface on which the fowl is placed. Upon completion of the tendon pulling and trimming operation, the table may be tilted about hinge 24 by means hereinafter described, permitting the fowl to slide off the table and into a container or onto a conveyor.

Spaced about the level of the table are a left-hand and a right-hand subassembly, 26 and 27, respectively. As illustrated in the accompanying drawings, the right-hand subassembly 27 is movable toward and away from the stationary left-hand subassembly to adjust the machine for handling fowl of different lengths. For this purpose, subassembly 27 is formed with depending vertical sides 28 which are attached to transverse T-shaped bars 29 at front and rear along their bottom edges. The vertical legs of T-bars 29 are transversely slidably mounted between pairs of transverse horizontal ways 31 which permit the right-hand subassembly to slide transversely. A longitudinal rod 32 passes through holes in the bottoms of the legs of bars 29 and pinions 33 are fixed on said rod meshing with transverse rack 34 fixed to one of the ways 31 of each pair. A hand wheel 36 is fixed on rod 32 and by turning the hand wheel the right subassembly may be moved.

Each subassembly includes a pair of vertical guards 41 through which passes drive shaft 21, the drive shaft being received in bearings 42 on the guards. The guards 41 on the right-hand subassembly move therewith. Guards 41 are approximately semicircular in outline in side elevation and are supported by frame 20, and are notched on the front as indicated by reference numeral 43, the notches being dimensioned to receive the neck or feet of the poultry as the case may be.

Mounted for rotation with drive shaft 21 on the left-hand subassembly are a tendon pulling arm 46 and a knife 47, these members being spaced apart axially on shaft 21 and likewise angularly displaced. Mounted for rotation with drive shaft 21 on the right-hand subassembly 27 is knife 48, said knife being slidable along shaft 21 to move with subassembly 27, but being keyed thereto. The lengths of knives 47 and 48 and of tendon puller 46 are such that they are confined within the outline of guards 41 and hence do not constitute a menace to personnel. The table 23 is apertured as indicated by numerals 51 and 52 to provide clearance for passage of the knives and tendon puller. The lower edges 53, 54, and 55 of the notches 43 of three of the guards 41 comprise what are termed herein "knife edges" cooperate, respectively, with knives 47 and 48 and tendon puller 46. As knives 47 and 48 revolve and come in close proximity to knife edges 53 and 54, respectively, they shear off the feet and neck of the poultry. Tendon puller 46 is provided with two notches 57 and 58 in its leading edge, one notch for each leg of the fowl. As puller 46 meets the legs of the poultry and brings the legs into contact with knife edge 55, it first fractures the bone and then pulls the tendons from the upper legs, the tendons adhering to the lower leg and being pulled out of the upper leg. Hook 56 on the opposite guard 41 restrains the legs against twisting movement and insures their proper alignment while the tendons are being pulled. The relative positions of the parts is such that the tendon puller 46 operates first, followed by knives 47 and 48. Knife 47 severs the leg of the fowl at the knee joint, cutting off the stub left by the tendon puller.

In order to eject the stub of the knee from the machine, a cam 61 is fixed on shaft 21, said cam being engaged by follower rod 62, slidably supported from guard 41, the outer end of which carries pusher bar 63 which pushes the stub of the leg of the fowl out of notch 43. Follower rod 62 is held in contact with cam 61 by spring 64 which biases rod 62 inward.

As has been stated, after the tendons have been pulled and the legs and neck severed, table 23 is tilted. Cam 61 and a second cam 66 on shaft 21 movable with subassembly 27 function to tilt table 23. For such purpose bell cranks 67 are pivotally mounted on guards 41, the short arms 68 of each said crank being in contact with cams 61 and 66. The opposite ends 69 of bell cranks 67 are articulately connected with vertical push rods 71 which are maintained vertical by rod guide sleeves 72 mounted on guards 41. The lower ends of rods 71 are articulately connected to table 23 at vertical webs 73, said webs 73 being tied together by tie rod 74 so that the two ends of table 23 tilt simultaneously. Table 23 is biased upwardly by springs 76 which also serve to maintain arms 68 in contact with cams 61 and 66.

*Operation*

At the commencement of a cycle of operation, the attendant places a fowl on table 23, the neck projecting outward through notch 43 in guard 41 of the right-hand subassembly and the feet projecting through notch 43 in the left-hand subassembly. Handle 36 is cranked so that the two subassemblies are the proper distance apart for the length of the fowl and the knee of the leg is within guard 41. With the fowl in position, the operator then presses the pedal or other switch or lever which actuates the one-cycle clutch 22 which turns shaft 21 one revolution. During this cycle the tendon puller arm 46 first comes down on the legs of the poultry below the knee joint, one leg fitting in each of notches 57 and 58. The tendon puller breaks the leg bones against knife edge 55 and then pulls the tendons down from the drum stick by reason of their adherence to the lower part of the leg. Immediately thereafter knives 47 and 48 come around and shear off the legs at the knee joint and the neck by coaction with knife edges 53 and 54, respectively. Thereupon cams 61 and 66 cause table 23 to tilt to slide the trimmed carcass off table 23 and onto a conveyor or into a container. After tilting, springs 76 restore table 23 to horizontal position. Cam 61 also actuates pusher bar 63 to eject the stub of the leg from notch 43.

It will thus be seen that the machine in one cycle of operation removes the tendons from both legs and trims the legs and head from the fowl. The rapidity with which the attendant can place the fowl in position is the only limitation of consequence on the capacity of the machine.

The machine may be simplified by elimination of the neck trimming function through elimination of the right-hand subassembly 27. In this simplification, especially, the power drive of shaft 21 may be eliminated and a treadle or hand wheel or lever employed to rotate shaft 21. Other modifications may be made within the scope of the appended claims.

What is claimed is:

1. A tendon remover, comprising in combination, a frame, first means mounted on said frame, said first means having a first edge, a tendon-pulling arm mounted for movement in a plane parallel to and adjacent said first edge, said arm cooperating with said first edge to break a poultry leg bone positioned in said first means, grip the leg bone below the break, and then pull the tendons from the drum stick of the poultry leg, and second means mounted on said frame for moving said tendon-pulling arm past said first edge.

2. A poultry leg processing machine comprising in combination a frame, first means mounted on said frame, said first means being notched for the reception of at least one poultry leg and having a first edge, a tendon-pulling arm mounted on said frame for movement adjacent said first means in a direction substantially transverse to the direction of a poultry leg positioned in the notch and parallel to said first edge, said arm cooperating with said first edge to break a poultry leg, grip the severed leg below the break, and then draw the tendons from the drum stick of the leg, and second means mounted on said frame for moving said tendon-pulling arm past said first edge.

3. A poultry leg processing machine comprising in combination a frame, first means mounted on said frame, said first means being notched for the reception of at least one poultry leg and having a first edge, a tendon-pulling arm mounted on said frame for movement adjacent said first means in a direction substantially transverse to the direction of a poultry leg positioned in the notch and parallel to said first edge, said arm cooperating with said first edge to break a poultry leg, grip the severed leg below the break, and then draw the tendons from the drum stick of the leg, and second means mounted on said frame for moving said tendon-pulling arm past said first edge, ejector means mounted on said frame operable to eject leg stubs from said notch, and third means mounted on said frame for actuating said ejector means.

4. A poultry leg processing machine comprising, in combination, a frame, a shaft rotatably mounted on said frame, means operatively connected to said shaft for rotating said shaft, a knife edge mounted on said frame and extending transversely to said shaft, and a tendon pulling arm on said shaft having a path of movement parallel to and adjacent said knife edge, said tendon pulling arm cooperating with said knife edge to break poultry leg bones positioned on said knife edge which bones extend transverse to said knife edge and then pull the tendons from said legs by drawing the lower portion of the leg away from the carcass.

5. A poultry leg processing machine comprising, in combination, a frame, a shaft rotatably mounted on said frame, means operatively connected to said shaft for rotating knife edge, a knife edge mounted on said frame and extending transversely to the axis of said shaft, and a tendon pulling arm on said shaft having a path of movement parallel to and adjacent said knife edge, said arm having inwardly extending notches on its leading edge, said leading edge extending transverse to said shaft, said arm cooperating with said knife edge to break poultry leg bones positioned on said knife edge extending transverse to said knife edge, and said notches serving to pull the tendons from the thighs of poultry legs.

6. A poultry leg processing machine comprising, in combination, a frame, a shaft rotatably mounted on said frame, means operatively connected to said shaft for rotating said shaft, a knife edge mounted on said frame extending transversely to said shaft, a guard mounted on said frame and extending transversely to said shaft, said guard having a notch in its edge for reception of a poultry leg, the lower margin of said notch comprising said knife edge, said notch extending transversely to said shaft and positioned to hold a poultry leg extending parallel to said shaft, and a tendon pulling arm on said shaft having a path of movement parallel to and adjacent said knife edge, said arm cooperating with said knife edge to break poultry leg bones positioned on said knife edge in said notch, and then pull the tendons from said leg by drawing the lower portions of the leg away from the carcass.

References Cited in the file of this patent

UNITED STATES PATENTS

| | | |
|---|---|---|
| 732,300 | Hollender | June 30, 1903 |
| 1,729,845 | Sawicki | Oct. 1, 1929 |
| 1,890,394 | Long | Dec. 6, 1932 |
| 2,258,884 | Duffy, Sr. | Oct. 14, 1941 |
| 2,425,077 | Alexander | Aug. 5, 1947 |
| 2,669,748 | Ine | Feb. 23, 1954 |
| 2,690,588 | Hillsen, Sr. | Oct. 5, 1954 |